May 18, 1965 W. K. JEKAT 3,183,968
INDUCTION CIRCULATORS
Filed May 14, 1962
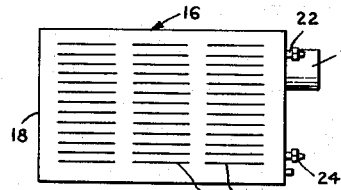
FIG. 1
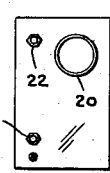
FIG. 2
FIG. 6
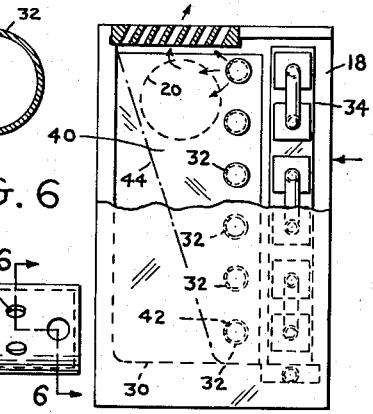
FIG. 3
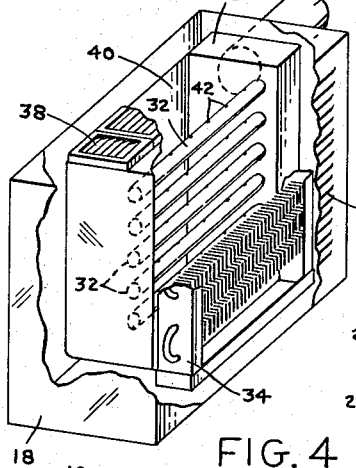
FIG. 4
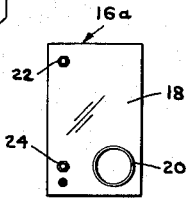
FIG. 5
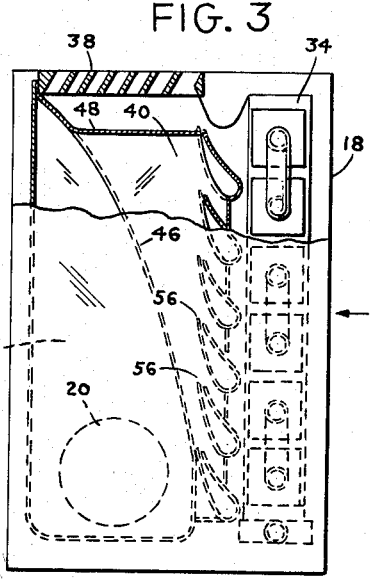
FIG. 9
FIG. 7
FIG. 8
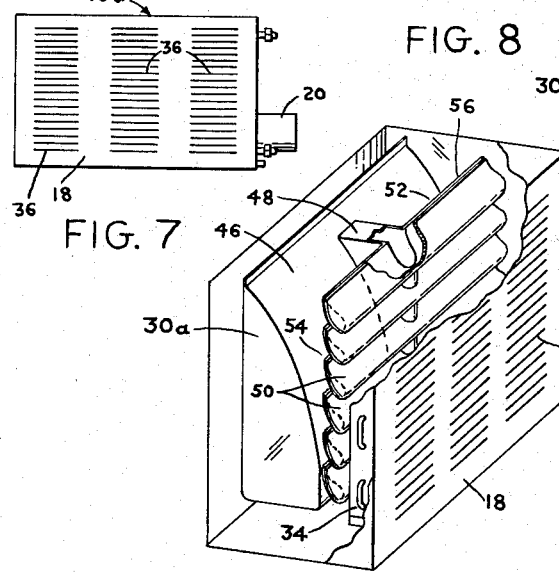
FIG. 10
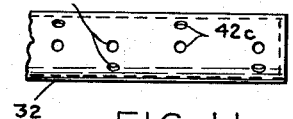
FIG. 11
WALTER K. JEKAT
INVENTOR.
BY Daniel H. Bobb
ATTY United States Patent Office 3,183,968
Patented May 18, 1965

3,183,968
INDUCTION CIRCULATORS
Walter K. Jekat, Upper Montclair, N.J., assignor to Worthington Corporation, Harrison, N.J., a corporation of Delaware
Filed May 14, 1962, Ser. No. 194,495
3 Claims. (Cl. 165—123)

This invention relates generally to induction circulators. More particularly the invention relates to induction circulators used in terminal units of a positve pressure multi-room air conditioning system.

The use of induction circulators is well known in the art. However, prior devices which used a plurality of stages did not have the induction circulators and the heat exchangers in operative association. Furthermore, the mixing chamber did not provide for maximum mixture of primary and secondary air.

It is the object of the present invention to overcome the disadvantages of the prior art and to improve the overall efficiency of induction circulators by the use of the novel induction circulator of the present invention.

In accordance with the present invention a terminal unit for a positive pressure multi-room air conditioner system which comprises a casing having openings therein for the passage of air therethrough and a plenum is disposed in the casing. The plenum is adapted to be connected to a source of conditioned primary air from the multi-room air conditioning system. Heat exchange means are disposed in the casing. Also a plurality of discharge means are in the casing and are connected to the plenum in vertically spaced relationship with each other. These discharge means are disposed in operative relation with the heat exchange means. Primary air is discharged through each of the discharge means inducing secondary air through the heat exchange means in heat exchange relation therewith to mix the primary air and to circulate therewith into the area being conditioned.

One of the objects of this invention is to provide induction circulators which are constructed to operate efficiently while maintaining basic simplicity in design.

Another object of this invention is to provide a plurality of tubes having nozzles therein which may be spaced and sized according to the particular needs of the system.

Another object of this invention is to provide the tubes and heat exchange means in operative association with each other.

Still another object of this invention is to provide at least one mixing chamber within the casing of maximum size which enables the unit to operate at a lower velocity thereby preventing drafts in the area to be conditioned.

Still another object of this invention to provide tube spacing for maximum efficiency without creating drafts in the area to be conditioned.

Still another object of this invention is to provide profile tubes which enable the pressure of the primary air to be reduced without losing capacity and further lessen the noise factor thereof.

Still another object of this invention is to provide the tubes having nozzle openings in the direction which will provide for maximum inducement of secondary air by the primary air.

With these and other objects in view as may appear from the accompanying specification, the invention consists of various features of construction and combination of parts which will be first described in connection with the accompanying drawings which show the preferred form of the induction circulators and the features forming the invention will be specifically pointed out in the claims.

In the drawings:
FIGURE 1 is a front elevation of a terminal unit in which the novel induction circulator is embodied.
FIGURE 2 is an end view of the terminal unit of FIGURE 1.
FIGURE 3 is an end view partly broken away of the terminal unit embodying the novel induction circulators.
FIGURE 4 is a perspective view partly broken away of the induction circulators.
FIGURE 5 is a fragmentary view of the end of the tube showing a preferred form of the hole spacing therein.
FIGURE 6 is a cross-section taken on line 6—6 of FIGURE 5.
FIGURE 7 is a front elevation of a modified terminal unit.
FIGURE 8 is an end view of the modified terminal unit of FIGURE 7.
FIGURE 9 is an end view partly broken away of the modified terminal unit showing a modified form of the induction circulators.
FIGURE 10 is a perspective view of the casing partly broken away showing the modified form of the induction circulators.
FIGURE 11 is an end view of the tube showing a modified form of the hole spacing therein.

Referring more particularly to the drawings, FIGURES 1 and 2 show the preferred form of the terminal unit, designated as 16. The casing 18 has a conduit 20 connected thereto which delivers primary air which is under pressure. The primary air may be conveniently supplied from a centrally located multi-room air conditioning system (not shown). The casing 18 also provides for the connection of the inlet tube 22 and outlet tube 24 to the heat exchange means 34 through which heat exchange media passes.

As illustrated in FIGURE 4 the components of the terminal unit 16 consist of the plenum 30, the plurality of induction circulators or tubes 32 extending from the plenum, the heat exchange means 34 positioned in the front of the casing 18 adjacent to the tubes 32, the front and top openings 36 and 38 respectively in the casing 18 and the mixing chamber 40 disposed rearwardly of the tubes 32 and heat exchange means 34.

The operation of the terminal unit 16 is as follows: Primary air having a positive pressure is introduced through the conduit 20 into the plenum 30. It is then distributed through the tubes 32 and outwardly therefrom through the nozzle openings 42 in the tubes 32 as seen in FIGURE 3. These openings 42 are preferably in the direction of the induced secondary air. The secondary air is thus induced through the front openings 36 in the casing 18 and passes in heat exchange relationship with the heat exchange means 34. It is understood that the heat exchange means 34 will have hot or cold media passing therein dependent on whether cold or hot conditioning is desired. The conditioning of the primary air may also be varied in accordance with whether the secondary air is desired to be warmed or cooled. Accordingly, the secondary air having passed in heat exchange relation with the heat exchange means 34 is further induced by the primary air exiting from the nozzle openings 42 of the tubes 32 into the mixing chamber 40. In the mixing chamber 40 the primary and secondary air is allowed to mix and thereafter be discharged through the top openings 38 of the casing 18 into the area to be conditioned.

It is important to note that the mixing chamber 40 is of a maximum area. This is possible because the plenum 30 is small and is located at one end of the casing 18 which allows for maximum mixing chamber area. The fact that the tubes 32 are located adjacent the heat exchange means 34 further provides for the added space in the mixing chamber 40.

FIGURE 3 shows an inclined wall 44 in the mixing chamber 40 which acts to guide the induced air. This allows for maximum mix as the area in the mixing chamber 40 is increased as more tubes 32 discharge primary air therein. It will be appreciated that in the upper areas more primary and secondary air has been induced and therefore the additional spacing provides for a greater, more uniform mix. Thereafter the mixture of primary and secondary air is discharged through the top openings 38 in the casing 18.

The pressure of the primary air can be varied according to the desired velocity of the secondary air thereby induced. The tubes 32 may be sized and spaced accordingly. The controlling factors are noise, drafts in the conditioned area and efficiency. Thus it is seen that by properly spacing the tubes the maximum efficiency may be obtained with the minimum amount of noise. The velocity is adjusted to be below that which would create drafts in the conditioned area. The efficiency of the operation is enhanced due to the design of the mixing chamber 40 which provides for the maximum allowable velocity without creating the disadvantages of drafts. It is understood that in certain applications the inclined rear wall 44 in the casing 18 will not be desired. If this is the case the wall 44 is not provided. Thus losing advantage of the wall is balanced by the fact that the mixing chamber is of a larger area.

The size and spacing of the nozzle openings 42 in the tubes 32 may be varied over a wide range. FIGURE 5 shows a preferred form of the tube 32 and nozzle openings 42 therein. The nozzle openings 42a at the end of the tube are larger and more closely spaced than the nozzle openings 42b further down toward the middle of the tube. The larger and closer spaced nozzle openings 42a are preferred at the end of the tube connected to the plenum and also at the remote end therefrom with the nozzle openings 42b in the middle section of smaller size and wider spacing. The reason for this preferred construction is to obtain a uniform distribution of primary air. The larger and closer air spacings compensate for the friction of the tube walls. The openings 42a and 42b can be reversed from that shown if large diameter tubes (not shown) are used. A modified form showing uniform spacing and nozzle openings 42c is seen in FIGURE 11.

A modified form of the invention is shown in FIGURES 7 and 8 in which the terminal unit 16a has a conduit 20 connected at its lower end. However, it will be understood that conduit 20 could be conveniently connected in any other place such as the rear or bottom of the casing 18.

The operation of the modified form of the novel induction circulators is substantially as that previously described. However, there are certain details in the construction which differ therefrom and will be described hereinafter.

The plenum 30a is connected at the rear of the casing 18. The front wall 46 of the plenum 30a is inclined rearwardly toward the top openings 38 of the casing 18. This provides for the area of the mixing chamber to increase in the direction of the top openings 38 of the casing 18. A single connecting element 48 extends from the front wall 46 of plenum 30a and provides for the passage of primary air therethrough to the profile tubes 50 connected thereon. Connecting element 48 is column-like in structure and provides for the mixing chamber 40 to be divided into a right portion 52 and a left portion 54. However, it is understood that the connecting element 48 could have been instead of a single element a plurality of elements in spaced relationship to each other to provide for either a single mixing chamber therebetween or a plurality of mixing chambers spaced as desired. The profile tubes 50 are connected to the connecting element 48 and are positioned one above the other adjacent to and in parallel relationship with the heat exchange means 34. The profile tubes 50 are in spaced relationship to each other to allow for the secondary air to be induced therethrough after passing in heat exchange relationship with the heat exchange means 34. Each profile tube 50 has slot openings 56 in the upper end thereof through which the primary air passes. The primary air is directed towards the mixing chamber 40 thus allowing a maximum amount of secondary air to be induced into the mixing chamber 40 where it will mix with the primary air and subsequently be discharged through the top openings 36 in the casing 18.

The profile tubes 50 could be any desired streamlined shaped which allows for the lowered resistance of the secondary air thereby increasing the efficiency of the operation. Furthermore, because of the particular shape the noise is substantially reduced. Accordingly, it would be possible to reduce the pressure of the primary air without lessening the capacity of the terminal units. It is understood that any suitable material could be used in either the round tubes 32 or the profile tubes 50, such as sheet metal or plastic.

It will be understood that this invention is not to be limited to the specific construction or arrangement of parts shown but that they may be widely modified within the invention defined by the claims.

What is claimed is:

1. A terminal unit for a positive pressure multi-room air conditioning system comprising:
    (a) a casing having a plurality of spaced inlet and outlet openings therein for the passage of air therethrough,
    (b) heat exchange means disposed in said casing adjacent said inlet openings,
    (c) a plenum disposed in said casing spaced from said heat exchange means and having a wall extending rearwardly away from said heat exchanger, said plenum being adapted to be connected to a source of supply of conditioned primary air from said multi-room air conditioning system,
    (d) a plurality of profile tube means disposed in said casing between said wall and said heat exchanger operatively positioned to draw secondary air through said heat exchange means,
    (e) a single connector connected to each of said profile tube means and said plenum and adapted to communicate the primary air from the plenum to each of said profile tube means,
    (f) each of said profile tube means having an elongated horizontal slot therein to permit the discharge of primary air therefrom,
    (g) said profile tube means being spaced one above the other to allow secondary air to pass therebetween,
    (h) each of said profile tube means slots being directed away from said heat exchange means.

2. The terminal unit of claim 1 wherein each of said profile tube means has an inclined surface spaced above the next lower profile tube means slot which surface is formed in the same plane as the flow of primary air from the next lower slot to effect laminar flow of primary air from the next lower profile tube means slot.

3. The terminal unit of claim 1 wherein each of said single connecting unit has a varied cross-section, said single connector varying in cross-section from a smallest cross-section adjacent the source of supply of conditioned primary air and a largest cross-section furthest from said source of supply of conditioned primary air to effect distribution of primary air through said profile tube means.

(References on following page)

References Cited by the Examiner
UNITED STATES PATENTS

| | | | |
|---|---|---|---|
| 2,348,127 | 5/44 | Grimes | 165—123 |
| 2,463,322 | 3/49 | Sewell et al. | 165—123 X |
| 2,850,242 | 9/58 | Newton | 165—123 X |
| 2,913,227 | 11/59 | Bottorf et al. | 98—38 X |
| 2,995,078 | 8/61 | Ringquist et al. | 98—38 |
| 3,012,760 | 12/61 | McGrath | 165—123 X |
| 3,041,047 | 6/62 | Ashley et al. | 98—38 |
| 3,092,178 | 6/63 | Birdsall | 98—38 X |
| 3,114,307 | 12/63 | Hugeson | 98—38 |

FOREIGN PATENTS

| | | |
|---|---|---|
| 968,359 | 4/50 | France. |
| 92,156 | 7/58 | Norway. |

CHARLES SUKALO, *Primary Examiner.*